United States Patent
Masuda (10) Patent No.: US 10,654,455 B2
(45) Date of Patent: May 19, 2020

(54) ELECTRIC BRAKE DEVICE (71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/399,334

(22) Filed: Apr. 30, 2019

(65) Prior Publication Data

US 2019/0256062 A1 Aug. 22, 2019

Related U.S. Application Data

(63) Continuation of application No. PCT/JP2017/039689, filed on Nov. 2, 2017.

(30) Foreign Application Priority Data

Nov. 4, 2016 (JP) ................................ 2016-215885

(51) Int. Cl.
*F16D 55/08* (2006.01)
*B60T 8/17* (2006.01)
(Continued)

(52) U.S. Cl.
CPC ................ *B60T 8/17* (2013.01); *B60T 1/065* (2013.01); *B60T 8/00* (2013.01); *B60T 8/172* (2013.01);
(Continued)

(58) Field of Classification Search
CPC ........ F16D 65/18; B60T 13/74; B60T 13/741; B60T 8/17; B60T 8/32; B60T 8/40; B60T 8/171; B60T 17/20
(Continued)

(56) References Cited

U.S. PATENT DOCUMENTS 9,856,936 B2 * 1/2018 Masuda ................... H02K 7/06
2007/0199773 A1 * 8/2007 Saito ........................ B60T 8/321
188/72.1
(Continued)

FOREIGN PATENT DOCUMENTS

JP 2002-51597 2/2002
JP 2003-247576 9/2003
(Continued)

OTHER PUBLICATIONS

Translation by WIPO of the International Preliminary Report on Patentability dated May 16, 2019 in corresponding International Patent Application No. PCT/JP2017/039689 (6 pages).

(Continued)

*Primary Examiner* — Christopher P Schwartz (57) ABSTRACT

The electric brake device includes a control device for performing follow-up control such that a braking force estimated value estimated by a braking force estimator follows a given braking force command value. The control device includes an angle-sensorless control function section for determining a phase of phase current of an electric motor irrespective of an actual angle of the electric motor and controlling the electric motor to have a current value that is based on the determined phase of the phase current. The angle-sensorless control function section includes a current phase determination section for determining a current phase that is the phase of the phase current of the electric motor on the basis of a deviation between the braking force command value and the braking force estimated value.

7 Claims, 5 Drawing Sheets

(51) Int. Cl.
| | |
|---|---|
| *H02P 21/09* | (2016.01) |
| *H02P 21/18* | (2016.01) |
| *H02P 21/22* | (2016.01) |
| *H02P 21/36* | (2016.01) |
| *B60T 1/06* | (2006.01) |
| *B60T 8/172* | (2006.01) |
| *B60T 13/74* | (2006.01) |
| *B60T 17/22* | (2006.01) |
| *F16D 55/02* | (2006.01) |
| *F16D 65/18* | (2006.01) |
| *H02P 21/26* | (2016.01) |
| *H02P 6/18* | (2016.01) |
| *B60T 8/00* | (2006.01) |
| *B60T 17/18* | (2006.01) |
| *H02P 29/032* | (2016.01) |
| *F16D 121/14* | (2012.01) |
| *F16D 121/24* | (2012.01) |
| *F16D 125/48* | (2012.01) |

(52) U.S. Cl.
CPC ............ *B60T 13/74* (2013.01); *B60T 13/746* (2013.01); *B60T 17/18* (2013.01); *B60T 17/221* (2013.01); *F16D 55/02* (2013.01); *F16D 65/18* (2013.01); *H02P 6/18* (2013.01); *H02P 21/09* (2016.02); *H02P 21/18* (2016.02); *H02P 21/22* (2016.02); *H02P 21/26* (2016.02); *H02P 21/36* (2016.02); *H02P 29/032* (2016.02); *B60T 2270/402* (2013.01); *B60T 2270/406* (2013.01); *F16D 2121/14* (2013.01); *F16D 2121/24* (2013.01); *F16D 2125/48* (2013.01)

(58) Field of Classification Search
USPC ................ 303/3, 7, 15, 20, 155; 701/70–72; 318/400.32; 188/156–164
See application file for complete search history.

(56) References Cited

U.S. PATENT DOCUMENTS

| | | | |
|---|---|---|---|
| 2014/0111130 A1* | 4/2014 | Yamada | B60L 3/0038 318/400.32 |
| 2016/0178021 A1 | 6/2016 | Masuda | |
| 2018/0194334 A1* | 7/2018 | Masuda | B60T 8/1761 |
| 2018/0194338 A1* | 7/2018 | Baehrle-Miller | B60T 13/741 |
| 2019/0001839 A1* | 1/2019 | Masuda | B60L 15/20 |

FOREIGN PATENT DOCUMENTS

| | | |
|---|---|---|
| JP | 2004-96979 | 3/2004 |
| JP | 2006-174681 | 6/2006 |
| JP | 2008-295279 | 12/2008 |
| JP | 2015-51729 | 3/2015 |
| JP | 2016-55849 | 4/2016 |

OTHER PUBLICATIONS

International Search Report dated Feb. 6, 2018 in corresponding International Application No. PCT/JP2017/039689.

\* cited by examiner

ELECTRIC BRAKE DEVICE

CROSS REFERENCE TO THE RELATED APPLICATION

This application is a continuation application, under 35 U.S.C. § 111(a), of international application No. PCT/JP2017/039689, filed Nov. 2, 2017, which is based on and claims Convention priority to Japanese patent application No. 2016-215885, filed Nov. 4, 2016, the entire disclosure of which is herein incorporated by reference as a part of this application.

BACKGROUND OF THE INVENTION

Field of the Invention

The present invention relates to an electric brake device, specifically, an electric brake device capable of performing angle-sensorless control.

Description of Related Art

The following technologies have been proposed for an electric motor device and an electric actuator that uses an electric motor.

(1) A technology in which rotation drive by an electric motor is reduced in speed by a speed reducer or reduction gear, this rotation drive having been reduced in speed is converted into linear drive via a linear motion mechanism, and a friction pad is brought into pressure contact with a disc rotor by this linear drive, thereby applying braking force (Patent Document 1).

(2) A sensorless vector control technology using a phase estimation observer for rotor magnetic flux (Patent Document 2).

(3) A sensorless vector control technology for a synchronous motor, in which a rotor angle is estimated from high frequency voltage and current (Patent Document 3).

(4) A sensorless vector control technology for an AC motor, in which a rotor angle and a rotor phase are estimated from imperfect-circle high frequency voltage and current, in a γ-δ semi-synchronous coordinate system obtained through two-phase conversion (Patent Document 4).

(5) A technology related to a sensorless control method, in which a phase difference is automatically adjusted in accordance with load, with a motor current phase being in such a region that torque monotonically increases relative to current phase (Patent Document 5).

RELATED DOCUMENT

Patent Document

[Patent Document 1] JP Laid-open Patent Publication No. 2003-247576

[Patent Document 2] JP Laid-open Patent Publication No. 2004-96979

[Patent Document 3] JP Laid-open Patent Publication No. 2002-51597

[Patent Document 4] JP Laid-open Patent Publication No. 2008-295279

[Patent Document 5] JP Laid-open Patent Publication No. 2006-174681

For example, in an electric brake device using an electric actuator to which a technology such as one in Patent Document 1 is applied, an electric motor may be required to have very high redundancy. For example, even when an abnormality occurs in a motor coil, a sensor, or the like, an operation may need to be continued. In particular, in a case where a motor angle sensor is used, the motor angle sensor has to be included in the motor in many cases, and thus may be subjected to a very high load.

As a measure against the above, for example, angle-sensorless control such as ones disclosed in Patent Documents 2 to 5 may be used. As the angle-sensorless control, for example, a method disclosed in Patent Document 2 has been generally known in which an angle of rotator is estimated from the relationship between voltage and current dependent on induced voltage due to rotor magnetic flux and the like. However, in Patent Document 1, for example, when an operation for obtaining an angular speed of zero to a low speed, such as an operation of performing follow-up with respect to a pedal manipulation or maintaining braking force at a predetermined small value, is performed in an electric brake device, estimation of the angle may become difficult owing to very small induced voltage. In addition, for example, in an ABS (Antilock Brake System) an operation that results, in very great fluctuation in angular speed such as an operation of a brake repeating pressure increase and pressure reduction at high speed. When such operation is continuously performed, an estimation error due to an error in the inductance of a motor or the like does not sufficiently converge, whereby accurate estimation of an angle may become difficult.

As a method for enabling estimation of a motor angle even in the above case, for example, a method disclosed in Patent Document 3 or 4 may be used in which a voltage having a predetermined frequency is superposed on an electric motor drive voltage, and the motor angle is estimated from, the relationship between voltage and current at the above-mentioned predetermined frequency, with use of saliencies of an inductance and a magnetic saturation characteristic. However, for example, a motor used for the electric brake device is designed to be as small as possible in many cases, because, for example, a mounting space for the motor is limited or moment of inertia needs to be made as small as possible in order to perform high-speed response. Accordingly, relatively great fluctuation in angular speed occurs in synchronization with the above-mentioned high-frequency current and influence of the fluctuation in angular speed is exerted on the relationship between the high-frequency voltage and current, whereby estimation of the angle may become difficult.

As an angle-sensorless control method that does not require any superposition of frequency components as in the above method, for example, a method disclosed in Patent Document 5 has been proposed in which a two-phase-orthogonal coordinate system is rotated by a vector rotator in a control device, with a current phase being in such a region (MIR region) that torque shows a tendency of monotonically increasing relative to a phase difference. However, in this method, a deviation is generated between the phase of the vector rotator and an actual rotor phase in accordance with a load at the time of positioning in case that a vector becomes stationary. Thus it may become difficult to perform accurate positioning in an electric brake device in which the load fluctuates in accordance with the braking force.

In addition, if the method in Patent Document 5 is applied to an electric brake device, motor current when positioning is performed such that the braking force comes to have a predetermined value is constantly fixed at the maximum current value. Accordingly, the same degree of motor current as that when great braking force is generated, is applied also at the time of a gentle brake manipulation for moderate braking or an operation of releasing a brake by taking a foot off a brake pedal, resulting in power consumption increase. Furthermore, since such great current can be constantly applied, heat generation of the electric motor increases, whereby the size, the weight, and the cost of the motor may be increased.

SUMMARY OF THE INVENTION

An object of the present invention is to provide a brake device that can perform accurate follow-up control of a braking force estimated value relative to a braking force command value through angle-sensorless control, and that enables improvement in redundancy, reduction in cost, and the like.

Hereinafter, in order to facilitate understanding of the present invention, the present invention will be described with reference to the reference numerals in embodiments for the sake of convenience.

An electric brake device according to the present invention is an electric brake device including: a brake rotor Br; a friction member 9 configured to be brought into contact with the brake rotor Br; a friction member manipulator 6 configured to bring the friction member 9 into contact with the brake rotor Br; an electric motor 4 configured to drive the friction member manipulator 6; a braking force estimator 26 configured to obtain a braking force estimated value which is an estimated value of braking force generated when the friction member 9 is brought into contact with the brake rotor Br by the friction member manipulator 6; and a control device 2, 2A configured to perform follow-up control such that the braking force estimated value estimated by the braking force estimator 26 follows a given braking force command value, wherein the control device 2, 2A includes an angle-sensorless control function section 20 configured to determine a phase of phase current of the electric motor 4 irrespective of an actual angle of the electric motor 4 and control the electric motor 4 to have a current value that is based on the determined phase of the phase current, and the angle-sensorless control function section 20 includes a current phase determination section 25b configured to determine a current phase that is the phase of the phase current of the electric motor 4 on the basis of a deviation between the braking force command value and the braking force estimated value.

In this configuration, the angle-sensorless control function section 20 of the control device 2, 2A determines a current phase of the electric motor 4 irrespective of an actual angle of the electric motor 4, and controls the electric motor 4 in accordance with a current value (motor current target value) that is based on the determined current phase. The current phase determination section 25b of the angle-sensorless control function section 20, for example, determines the current phase on the basis of a deviation between the braking force command value and the braking force estimated value estimated by the braking force estimator 26. The control device 2, 2A obtains a calculation electrical angular speed from the deviation between the braking force estimated value and the braking force command value, and obtains a motor current on the basis of a calculation electrical angle determined from the calculation electrical angular speed. The control device 2, 2A causes the motor current obtained from the calculation electrical angle and the like to follow the motor current target value obtained from the current phase determined by the current phase determination section 25b and the like. In this manner, the motor current obtained in accordance with the deviation (braking force deviation) between the braking force estimated value and the braking force command value, follows the motor current target value obtained from the current phase not having the braking force deviation and the like. Accordingly, accurate follow-up control of the braking force estimated value relative to the braking force command value can be performed through the angle-sensorless control. In addition, in a case where no angle sensor for directly detecting the angle of the electric motor 4 is provided, the number of components can be reduced, resulting in reduction in cost.

The angle-sensorless control function section 20 may include:

an electrical angular speed calculation section 23 configured to determine a calculation electrical angular speed of the electric motor 4 on the basis of the deviation between the braking force command value and the braking force estimated value; and a calculation electrical angle determination section 24 configured to determine a calculation electrical angle of the electric motor 4 on the basis of an integral value of the calculation electrical angular speed determined by the electrical angular speed calculation section 23, and the current phase determination section 25b may control motor current of the electric motor 4 to have such a current phase as to satisfy or to be capable of satisfying a current condition that, when an electrical angle deviation obtained by subtracting an actual electrical angle of the electric motor 4 from the calculation electrical angle determined by the calculation electrical angle determination section 24 is within a predetermined positive or negative range, relationships in increase and decrease between the electrical angle deviation and electric motor torque become the same.

The calculation electrical angular speed and the calculation electrical angle are the electrical angular speed and the electrical angle calculated inside the control device, respectively.

The predetermined positive or negative range is a range arbitrarily determined in designing or the like, and is determined by, for example, obtaining an appropriate range through one or both of experiment and simulation.

In this configuration, the electrical angular speed calculation section 23 determines the calculation electrical angular speed of the electric motor 4 on the basis of the deviation between the braking force command value and the braking force estimated value. The calculation electrical angle determination section 24 converts the determined calculation electrical angular speed into a calculation electrical angle through integration or the like of the calculation electrical angular speed. The current phase determination section 25b controls the motor current to have such a current phase as to satisfy a current condition that, when an electrical angle deviation obtained by subtracting the actual electrical angle from the calculation electrical angle is within the predetermined positive or negative range, the relationships in increase and decrease between the electrical angle deviation and the electric motor torque become the same.

If the actual electrical angle lags behind the calculation electrical angle, the motor torque increases relative to a predetermined current norm. If the actual electrical angle advances from the calculation electrical angle, the motor torque decreases relative to a predetermined current norm. As a result, in a situation in which a certain load is applied, the actual electrical angle follows the calculation electrical angle calculated inside the control device, in a state where the actual electrical angle has an electrical angle deviation that corresponds to the load. In other words, an actual motor electrical angular speed follows the calculation electrical angular speed calculated inside the control device, with substantially no deviation. That is, since the calculation electrical angular speed is determined in accordance with the braking force deviation, the braking force estimated value can be caused to follow the braking force command value, with substantially no deviation.

The control device 2, 2A may have a function of determining a magnitude of the motor current of the electric motor 4 on the basis of one or both of the braking force command value and the braking force estimated value, and may control the motor current of the electric motor 4 on the basis of the current phase and the magnitude of the motor current. In this case, the responsiveness and the maximum braking force can be improved, and power consumption can be reduced when no braking manipulation is performed or a relatively gentle braking manipulation is performed.

When a value based on a braking force, which is at least one of the braking force command value and the braking force estimated value, becomes smaller than a predetermined value, the control device 2, 2A may set the magnitude of the motor current to a predetermined lower limit value irrespective of the value based on the braking force. The predetermined value is arbitrarily determined in designing or the like, and is determined by, for example, obtaining an appropriate value through one or both of experiment and simulation. In this configuration, in a region in which influences of cogging torque, actuator frictional force, and the like are relatively great and the braking force is low, the magnitude of the motor current is preferably set to the predetermined lower limit value irrespective of the value based on the braking force since a stable operation can be performed.

The control device 2, 2A may have a function of performing determination as to a brake-released state where the braking force is not generated, and may set the motor current to zero when the brake-released state is determined to have been achieved. In this case, power consumption in the brake-released state can be reduced.

The electric brake device may include an angle detector Sb configured to directly detect an angle of the electric motor 4 or a physical amount equivalent to the angle, wherein the control device 2A may include an abnormality determination section 35a configured to determine whether or not the angle detector Sb is normal, and, when determination that the angle detector Sb is normal is made by the abnormality determination section 35a, the control device 2A may control the motor current of the electric motor 4 to have a current phase that is based on a detection result from the angle detector Sb, whereas, when determination that the angle detector Sb is not normal is made by the abnormality determination section 35a, the control device 2A may control the electric motor 4 by means of the angle-sensorless control function section 20.

In this configuration, the responsiveness of an ordinary control system that uses the angle detector Sb can be made higher than that of a control system that uses the angle-sensorless control function section 20. When it is determined that the angle detector Sb is not normal, the electric motor 4 is controlled by the angle-sensorless control function section 20, whereby the redundancy can be improved.

The control device 2A may include a responsiveness-restricting function section 34 configured to perform restriction such that a response speed of the electric brake device is reduced in a case where the determination that the angle detector Sb is not normal is made and control is executed by the angle-sensorless control function section 20, as compared to a case where the angle detector Sb is normal. Here, in the case where the control is executed by the angle-sensorless control function section 20, overshoots or vibrations may occur owing to a steep change in the braking force command value. Therefore, by restricting the responsiveness of the electric brake device when the angle detector Sb is not normal as mentioned above, overshoots and vibrations can be suppressed, whereby the stability of the control system can be enhanced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
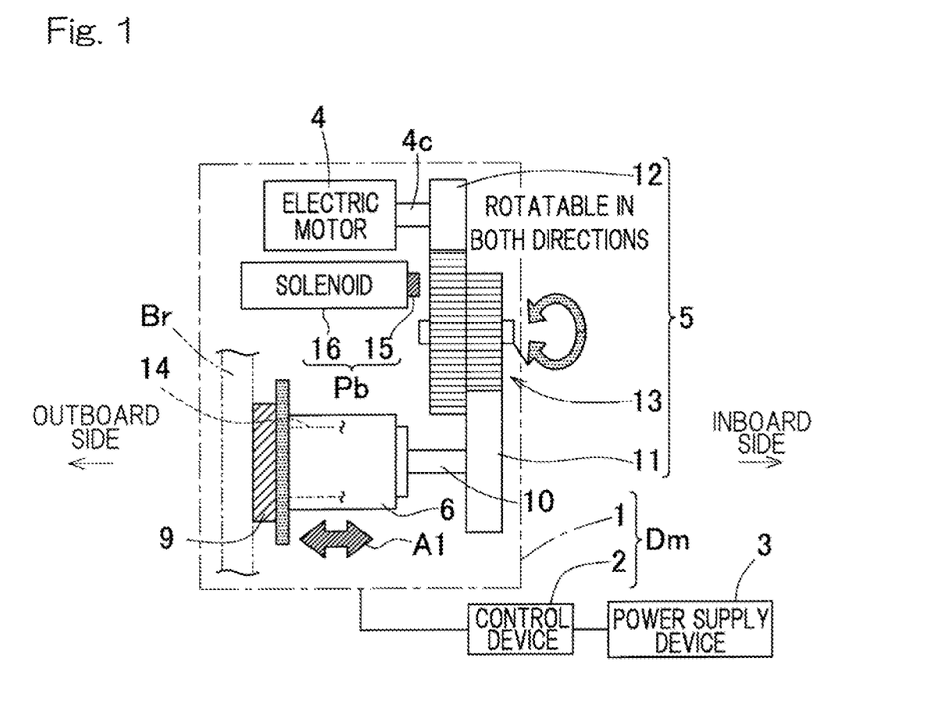
FIG. 1 is a diagram schematically indicating an electric brake device according to one embodiment of the present invention.

An electric brake device according to one embodiment of the present invention will be described with reference to FIG. 1 to FIG. 3. The electric brake device is mounted to, for example, a vehicle. As shown in FIG. 1, the electric brake device includes at least an electric motor device Dm, and, in the present embodiment, further includes a brake manipulator 18 (FIG. 2) and a power supply device 3. The electric motor device Dm includes an electric actuator 1 and a control device 2. Firstly, the electric actuator 1 will be described.

<Electric Actuator 1>

Figure 2:
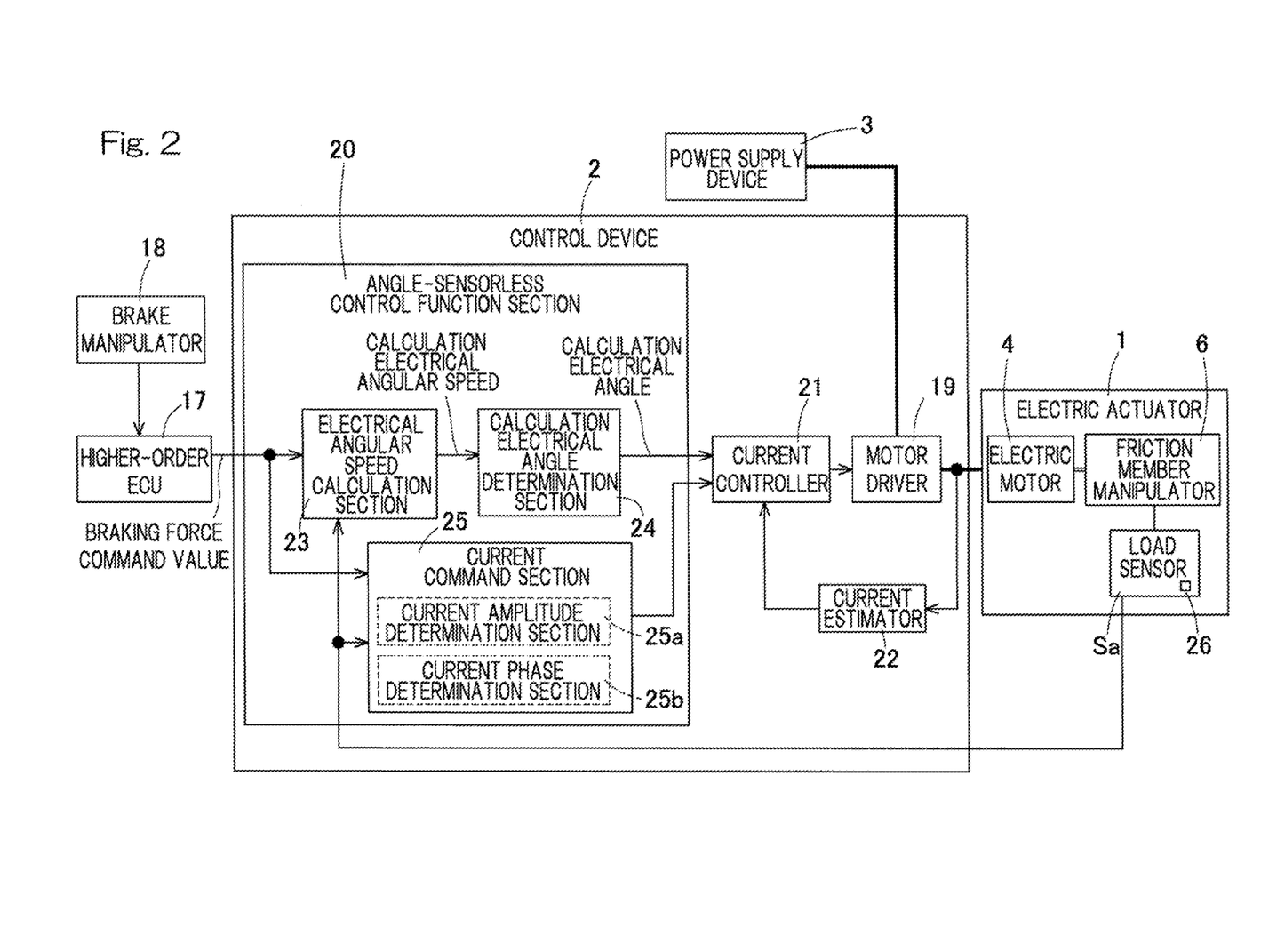
FIG. 2 is a block diagram indicating a schematic configuration of a control system of the electric brake device.

The electric actuator 1 includes an electric motor 4, a speed reduction mechanism 5, a friction member manipulator 6, a parking brake mechanism Pb, a brake rotor Br, a friction member 9, and a load sensor Sa (FIG. 2). The electric motor 4, the speed reduction mechanism 5, and the friction member manipulator 6 are incorporated in, for example, a housing (not shown) or the like.

The electric motor 4 is a synchronous electric motor having a stator and a rotor, and is preferably implemented by, for example, a permanent magnet type synchronous electric motor since the electric motor 4 comes to be disposed in a smaller space and generate higher torque. As the arrangement of the stator and the rotor in the electric motor 4 in the example in FIG. 1, the arrangement of those in a radial-gap-type motor that generates torque by means of interlinkage magnetic flux in the radial direction of a rotational shaft is employed. It is noted that the stator may include stator coils for two or more systems. Alternatively, the electric motor 4 may be an axial-gap-type motor that generates torque by means of interlinkage magnetic flux in the direction of the rotational shaft.

The speed reduction mechanism 5 is a mechanism for reducing the speed of rotation, or the number of rotation per unit time, of the electric motor 4, and includes a primary gear 12, an intermediate (secondary) gear 13, and a tertiary gear 11. In this example, the speed reduction mechanism 5 can reduce, by means of the intermediate gear 13, the speed of rotation of the primary gear 12 mounted to a rotor shaft 4c of the electric motor 4, and can transmit this reduced rotation to the tertiary gear 11 fixed to an end of a rotational shaft 10.

As the friction member manipulator 6, a linear motion mechanism is used. The linear motion mechanism serving as the friction member manipulator 6 is a mechanism in which rotary motion outputted from the speed reduction mechanism 5 is converted into linear motion of the linear motion portion 14 by a feed screw mechanism such that the friction member 9 comes into contact with, or is separated from, the brake rotor Br. The linear motion portion 14 is supported so as to be prevented from rotating and be movable in an axial direction denoted by an arrow A1. The friction member 9 is disposed at an end, on the outboard side, of the linear motion portion 14. By rotation of the electric motor 4 being transmitted to the friction member manipulator 6 through the speed reduction mechanism 5, the rotary motion is converted into linear motion and the linear motion is converted into pressing force of the friction member 9, thereby generating braking force. In a state where the electric brake device is mounted to a vehicle, the outer side of the vehicle in the vehicle width direction is referred to as outboard side, and the central side of the vehicle in the vehicle width direction is referred to as inboard side.

As an actuator 16 of the parking brake mechanism Pb, for example, a linear solenoid is used. A lock member 15 is caused to advance by the actuator 16 so as to be fitted in a locking hole (not shown) formed in the intermediate gear 13, so that the lock member 15 and the intermediate gear 13 are locked by each other, thereby preventing the intermediate gear 13 from rotating. Accordingly, the parking brake device Pb enters a parking lock state. By the lock member 15 being disengaged from the locking hole, the intermediate gear 13 is allowed to rotate, whereby the parking brake device Pb enters an unlock state.

<Control System and Power Supply System>

The control device 2 and the power supply device 3 are connected to the electric actuator 1. FIG. 2 is a block diagram indicating a schematic configuration of a control system of the electric brake device. For example, each wheel is provided with the corresponding control device 2 and the corresponding electric actuator 1. The power supply device 3 and a higher-order ECU (Electronic Control Unit) 17 which is a higher-order control unit of each control device 2 are connected to each control device 2. As the higher-order ECU 17, for example, an electric control unit for controlling the entire vehicle is used. The higher-order ECU 17 has a function of performing integrated control on each control device 2. The higher-order ECU is referred to also as a "VCU (Vehicle Control Unit)".

The power supply device 3 supplies power to the electric motor 4 and the control device 2. A stator coil of the electric motor 4 is connected to the power supply device 3 via a motor driver 19 of the control device 2. As the power supply device 3, for example, a battery, a DC/DC converter, a capacitor, or the like may be used, or a battery, a DC/DC converter, a capacitor, or the like may be used in combination. In a case where stator coils for two or more systems are used, power may be supplied from one system to each coil, or independent power supply systems may be formed.

The higher-order ECU 17 outputs a braking force command value to each control device 2 in accordance with a sensor output that changes in accordance with the manipulation amount of the brake manipulator 18. As the brake manipulator 18, for example, a brake pedal or the like can be used, but another operation tool such as a push-type switch or a joy stick may be used.

The control device 2 is implemented by: a microcomputer including a processor; a circuit board mounted with various types of electronic components such as a ROM (Read Only Memory) including a program to be executed by the processor, a RAM (Random Access Memory), and a coprocessor; and the like. The control device 2 includes an angle-sensorless control function section 20, a current controller 21, the motor driver 19, and a current estimator 22. The angle-sensorless control function section 20 includes an electrical angular speed calculation section 23, a calculation electrical angle determination section 24, and a current command section 25.

The electrical angular speed calculation section 23 calculates a calculation electrical angular speed of the electric motor 4 inside the control device in accordance with the braking force command value given from the higher-order ECU 17 and a braking force estimated value estimated with respect to the load sensor Sa, more specifically, on the basis of a deviation between these values. In this example, the load sensor Sa functions as a braking force estimator 26 for obtaining the braking force estimated value. However, as another example, the control device 2 may include a braking force estimator and the braking force estimator may calculate the braking force estimated value on the basis of a sensor output from the load sensor Sa.

The load sensor Sa is used for controlling pressing force, as braking force, between the friction member 9 (FIG. 1) and the brake rotor Br (FIG. 1). As the load sensor Sa, for example, a magnetic sensor or a strain sensor that detects displacement, a pressure sensor, or the like can be used. Alternatively, a sensor or the like that detects, as braking force, wheel torque or front-rear force of the wheel mounted with the electric brake device, can be used instead of the load sensor Sa.

The electrical angular speed calculation section 23 may set, as the calculation electrical angular speed, a value calculated by applying a predetermined control gain to the deviation between the braking force command value and the braking force estimated value. The calculation electrical angle determination section 24 has a function of converting the calculation electrical angular speed calculated by the electrical angular speed calculation section 23 into a calculation electrical angle by integrating the calculation electrical angular speed. As the calculation electrical angle determination section 24, for example, an integrator is used.

The current command section 25 has a function of generating a motor current target value, and includes a current amplitude determination section 25a for determining an amplitude of motor current, and a current phase determination section 25b for determining a phase of the motor current. The current amplitude determination section 25a and the current phase determination section 25b are preferably configured to determine, for example, a norm and a phase in a motor current vector converted for an orthogonal coordinate system since the configuration of the current controller 21 can be simplified. However, the sections 25a and 25b may directly determine the amplitude and the phase of three-phase alternating current.

The current controller 21 performs follow-up control such that a motor current estimated by a current estimator 22 and a motor current obtained from the calculation electrical angle determined by the calculation electrical angle determination section 24 of the angle-sensorless control function section 20 follow the motor current target value generated by the current command section 25 of the angle-sensorless control function section 20. As this follow-up control, for example, feedback control or feedforward control, based on motor characteristics and the like, may be used or the feedback control and the feedforward control may be used in combination.

The current estimator 22 may be of a non-contact type in which a magnetic field from a motor current transmission line is detected, or may employ a method in which a power transmission line is provided with a shunt resistor or the like and detection is performed based on voltages at both ends thereof. In this case, the current estimator 22 may be provided to a power transmission line on the secondary side as shown in FIG. 2, or may be provided to a power transmission line on the primary side and a secondary-side current in the power transmission line on the secondary side may be estimated. Alternatively, the current estimator 22 may be employed using a method of performing detection based on voltages or the like at predetermined locations in the motor driver 19. In detection of current, on the basis of detection of currents of two phases and the relationship in which the total sum of currents of three phases equals zero, a current of the remaining one phase may be estimated, or currents of all the three phases may be detected.

The motor driver 19 is preferably implemented by, for example, a half-bridge circuit that uses a switch element such as an FFT and preferably configured to perform PWM control in which a time period during which voltage is to be applied to the switch element is determined in accordance with a predetermined duty ratio, since the motor driver 19 comes to be inexpensive and have high performance. Alternatively, the motor driver 19 may be provided with a transformation circuit or the like and configured to perform PAM control.

It is noted besides the above that the functional blocks in FIG. 2 are given merely for convenience of explaining functions. Thus, in implementation of the functional blocks, the manner of division into functions are not necessarily to be the same as that in FIG. 2, and, as necessary, a plurality of the blocks may be unified or one block may be implemented as functions obtained by further dividing the one block. In addition, other sensors (not shown) such as a thermistor, a redundant system (not shown), and the like are appropriately provided as necessary.

Figure 3:
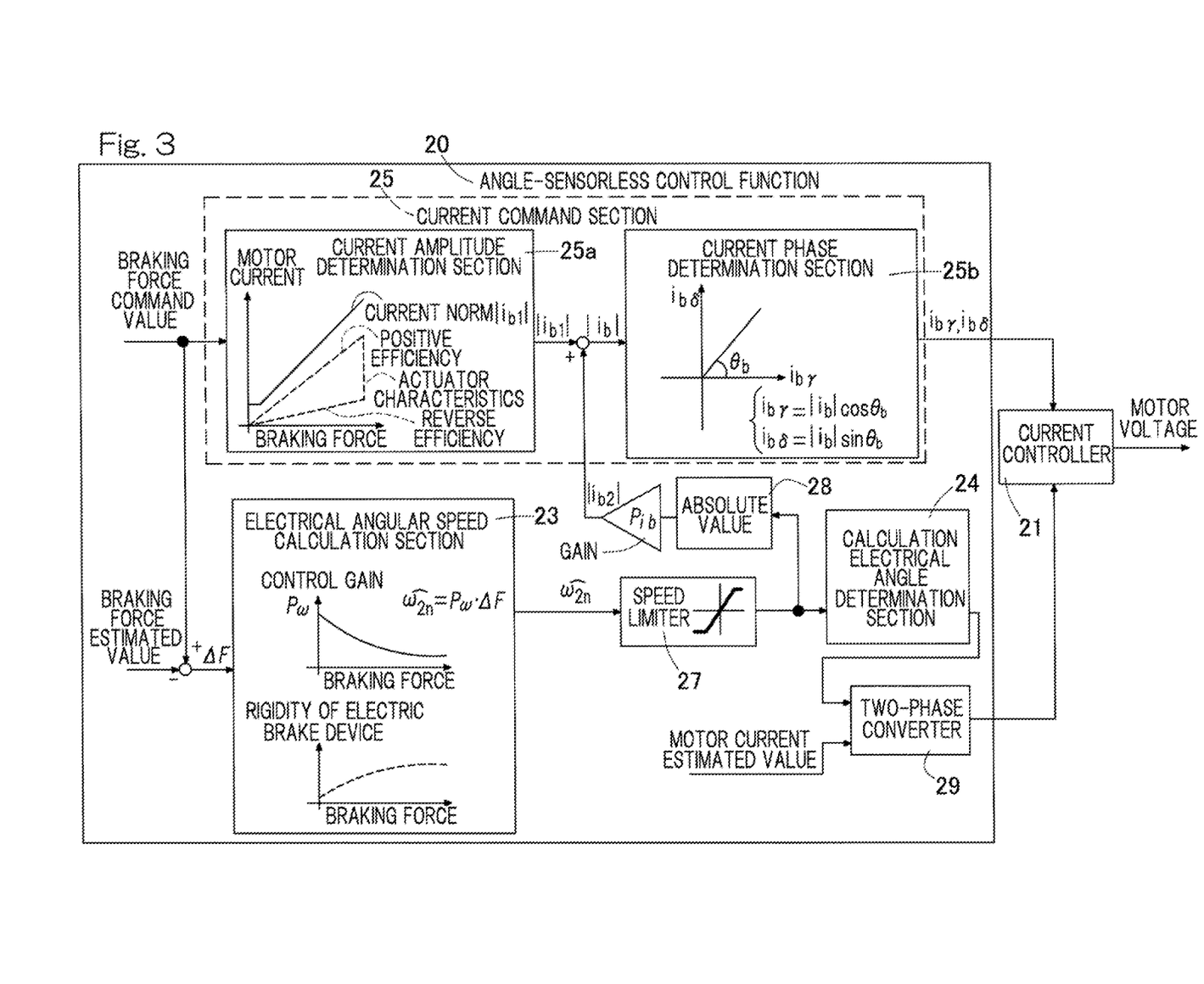
FIG. 3 is a block diagram indicating a configuration example of an angle-sensorless control function section of the electric brake device.

FIG. 3 is a block diagram indicating a configuration example of the angle-sensorless control function section 20. The electrical angular speed calculation section 23 in the present embodiment multiplies a deviation ΔF between a braking force command value and a braking force estimated value by a predetermined control gain $P_\omega$, thereby deriving a calculation electrical angular speed of the electric motor, i.e., a calculation electrical angular speed calculated inside the control device. The control gain $P_\omega$ is, for example, preferably a nonlinear gain obtained by taking into account influence of the rigidity, of the electric brake device, that becomes nonlinear owing to influence of the friction member 9 (FIG. 1) or the like, but may be a fixed value in order to reduce calculation load. Alternatively, the control gain $P_\omega$ can be determined on the basis of a required control performance by, for example, using a PID controller (Proportional Integral Differential Controller) in which integration and differentiation are used in combination, as necessary.

The angle-sensorless control function section 20 includes a speed limiter 27 at a stage subsequent to the electrical angular speed calculation section 23. The speed limiter 27 restricts the absolute value, of the calculation electrical angular speed derived by the electrical angular speed calculation section 23, to be equal to or smaller than a predetermined value such that the calculation electrical angular speed does not exceed an electrical angular speed at which the electric motor 4 (FIG. 2) can be actually operated. The predetermined value is, for example, a value arbitrarily determined from specifications of the electric motor 4 (FIG. 2) or the like, and is determined by, for example, obtaining an appropriate value through one or both of experiment and simulation.

The current amplitude determination section 25a of the current command section 25 determines, from the braking force command value, a target current norm $|i_{b1}|$ which is a current norm in a motor current vector converted for an orthogonal coordinate system. When the phase of a motor current is controlled to be a desired current phase, a correlation between the braking force and the current norm is generally one shown in FIG. 3 on the basis of positive efficiency and reverse efficiency that are actuator characteristics (FIG. 3) of the friction member manipulator 6 (FIG. 2) or the like of the electric actuator.

Therefore, a desired braking force can be generated if the current norm which is the magnitude of motor current has a value sufficiently exceeding that of a current norm based on the positive efficiency of the actuator characteristics. In addition, if a value that is variable in accordance with the braking force command value is used as the current norm, it is possible to avoid a possibility that great current is kept applied when relatively low braking force is generated or the brake is released.

FIG. 3 shows an example in which the current amplitude determination section 25a determines a current norm by using the braking force command value. However, instead of the braking force command value, a braking force estimated value may be used, or both the braking force command value and the braking force estimated value may be used and the average value between both values or the like may be used. In addition, when a value based on a braking force, which is at least one of the braking force command value and the braking force estimated value, becomes smaller than a predetermined value, the current amplitude determination section 25a may set the current norm to a predetermined lower limit value irrespective of the value based on the braking force. In a region in which influences of cogging torque, actuator frictional force, and the like are relatively great and the braking force is low, the current norm is preferably set to the predetermined lower limit value irrespective of the value based on the braking force since a stable operation can be performed.

The angle-sensorless control function section 20 shown in FIG. 3 adds a current norm $|i_{b2}|$ to the target current norm determined by the current amplitude determination section 25a, thereby deriving a final target current norm $|i_b|$. The current norm $|i_{b2}|$ is outputted as a value obtained by multiplication, by a predetermined gain $P_{ib}$, of an absolute value 28. The absolute value 28 is outputted as a value obtained, via the speed limiter 27, from the calculation electrical angular speed derived from the electrical angular speed calculation section 23. The current norm $|i_{b2}|$ is thus preferably added to the target current norm $|i_{b1}|$ determined by the current amplitude determination section 25a, since the motor current increases when steep brake response is needed even in a region in which the braking force command value is small, for example, whereby the responsiveness can be improved. However, a current norm dependent only on braking force can be used with the gain $P_{ib}$ being set to zero.

The current phase determination section 25b sets a predetermined current phase $\theta_b$, and derives two phase currents $i_{b\gamma}$ and $i_{b\delta}$ which form a current vector based on the target current norm and the current phase $\theta_b$. The current controller 21 performs follow-up control such that motor currents, outputted as values obtained, via a two-phase converter 29, from the calculation electrical angle determined by the calculation electrical angle determination section 24, follow the two phase currents $i_{b\gamma}$ and $i_{b\delta}$. The current phase determination section 25b sets such a current phase $\theta_b$ as to satisfy a current condition that, when an electrical angle deviation obtained by subtracting the actual electrical angle of the electric motor 4 (FIG. 2) from the calculation electrical angle determined by the calculation electrical angle determination section 24 is within a predetermined positive or negative range, the relationships in increase and decrease between the electrical angle deviation and the electric motor torque can be the same.

The current phase $\theta_b$ is preferably set to be approximate to $\pi/4$ in the calculation electrical angle by the current phase determination section 25b. If the actual electrical angle lags behind the calculation electrical angle by the current phase $\theta_b$ set by the current phase determination section 25b, the motor torque increases relative to a predetermined current norm. If the actual electrical angle advances from the calculation electrical angle by the current phase $\theta_b$, the motor torque decreases relative to a predetermined current norm. As a result, in a situation in which a certain load is applied, the actual electrical angle follows the calculation electrical angle calculated inside the control device, in a state where the actual electrical angle has an electrical angle deviation that corresponds to the load. In other words, an actual motor electrical angular speed follows the calculation electrical angular speed calculated inside the control device, with substantially no deviation. That is, since the calculation electrical angular speed is determined in accordance with the braking force deviation, the braking force estimated value can be caused to follow the braking force command value, with substantially no deviation.

In the electric brake device described above, the control device 2 obtains a calculation electrical angular speed by multiplying, by the control gain, the deviation between the braking force estimated value and the braking force command value, and obtains a motor current from a calculation electrical angle determined by integration or the like of the calculation electrical angular speed. The control device 2 causes the motor current obtained from the calculation electrical angle and the like to follow the motor current target value obtained from the target current norm determined by the current amplitude determination section 25a and the like and from the current phase $\theta_b$ determined by the current phase determination section 25b. In this manner, the motor current obtained in accordance with the deviation (braking force deviation) between the braking force estimated value and the braking force command value, follows the motor current target value obtained from the current phase not having the braking force deviation and the like. Accordingly, accurate follow-up control of the braking force estimated value relative to the braking force command value can be performed through angle-sensorless control.

The control device 2 determines a current norm of the electric motor 4 on the basis of one or both of the braking force command value and the braking force estimated value, and controls the motor current of the electric motor 4 on the basis of the current norm and the current phase. Accordingly, the responsiveness and the maximum braking force can be improved, and power consumption can be reduced when no braking manipulation is performed or a relatively gentle braking manipulation is performed.

Each section in the control device 2 is, specifically, configured from a hardware circuit or a software mathematical function (hereinafter, sometimes referred to as "embodied model") on a processor (not shown) that enables calculation and output of a result thereof, with use of a LUT (Look Up Table) implemented by software or hardware, or a predetermined transform function contained in a library of software, or hardware equivalent thereto, etc., and, as necessary, a comparison function or a four arithmetic operation function in the library, or hardware equivalent thereto, etc.

Another embodiment will be described. In the following description, parts corresponding to the matters described in the preceding embodiment are denoted by the same reference numerals, and the redundant description thereof is omitted. When only a part of a configuration is described, the remaining part of the configuration is the same as that described in the preceding embodiment, unless otherwise specified. The same advantageous effects are achieved by the same configuration. A combination of parts that are specifically described in the embodiments can be implemented, and, further, the embodiments may be partially combined unless such combination causes any problem.

Figure 4:
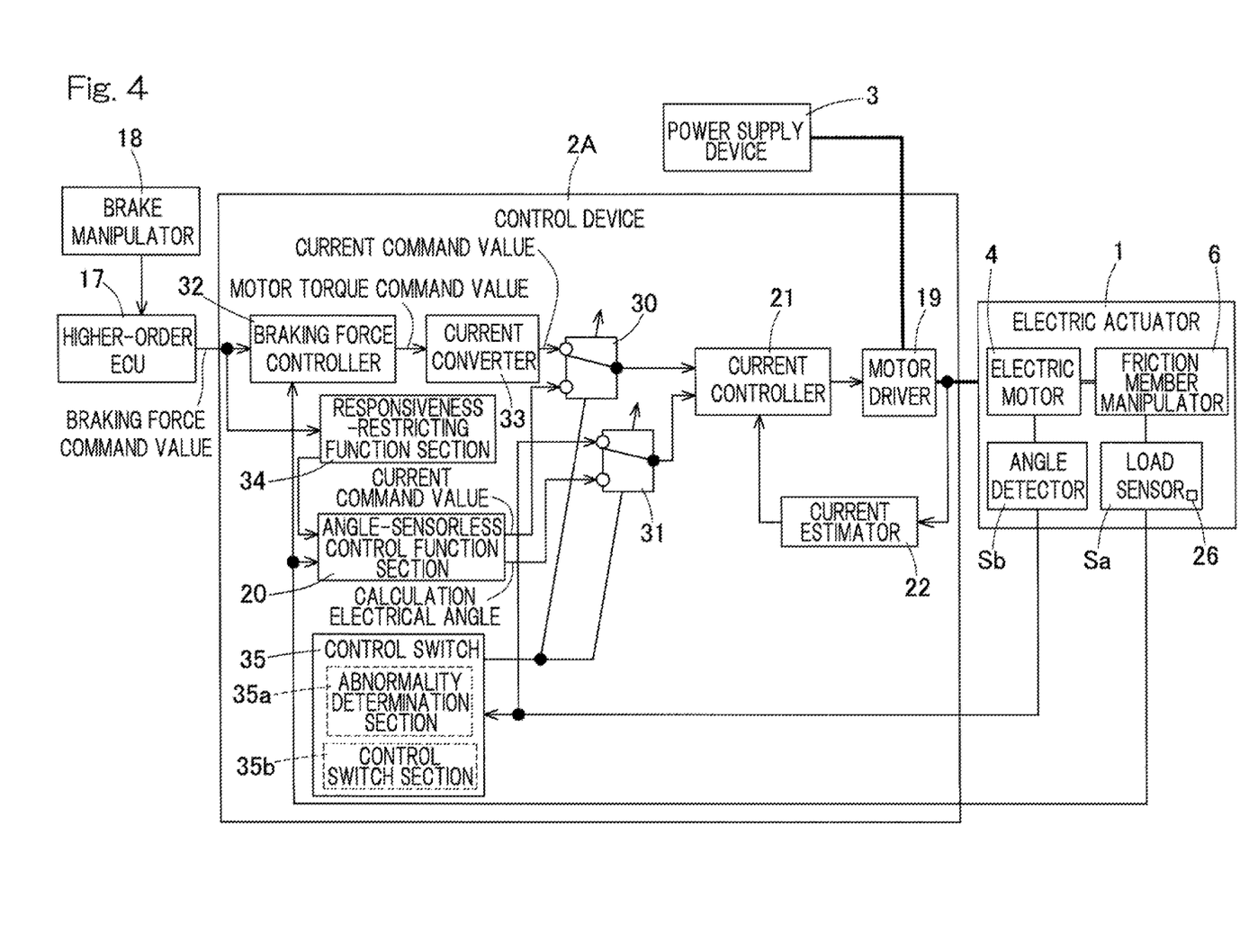
FIG. 4 is a block diagram of a control system, in a case where an angle detector is normal, of an electric brake device according to another embodiment of the present invention.
Figure 5:
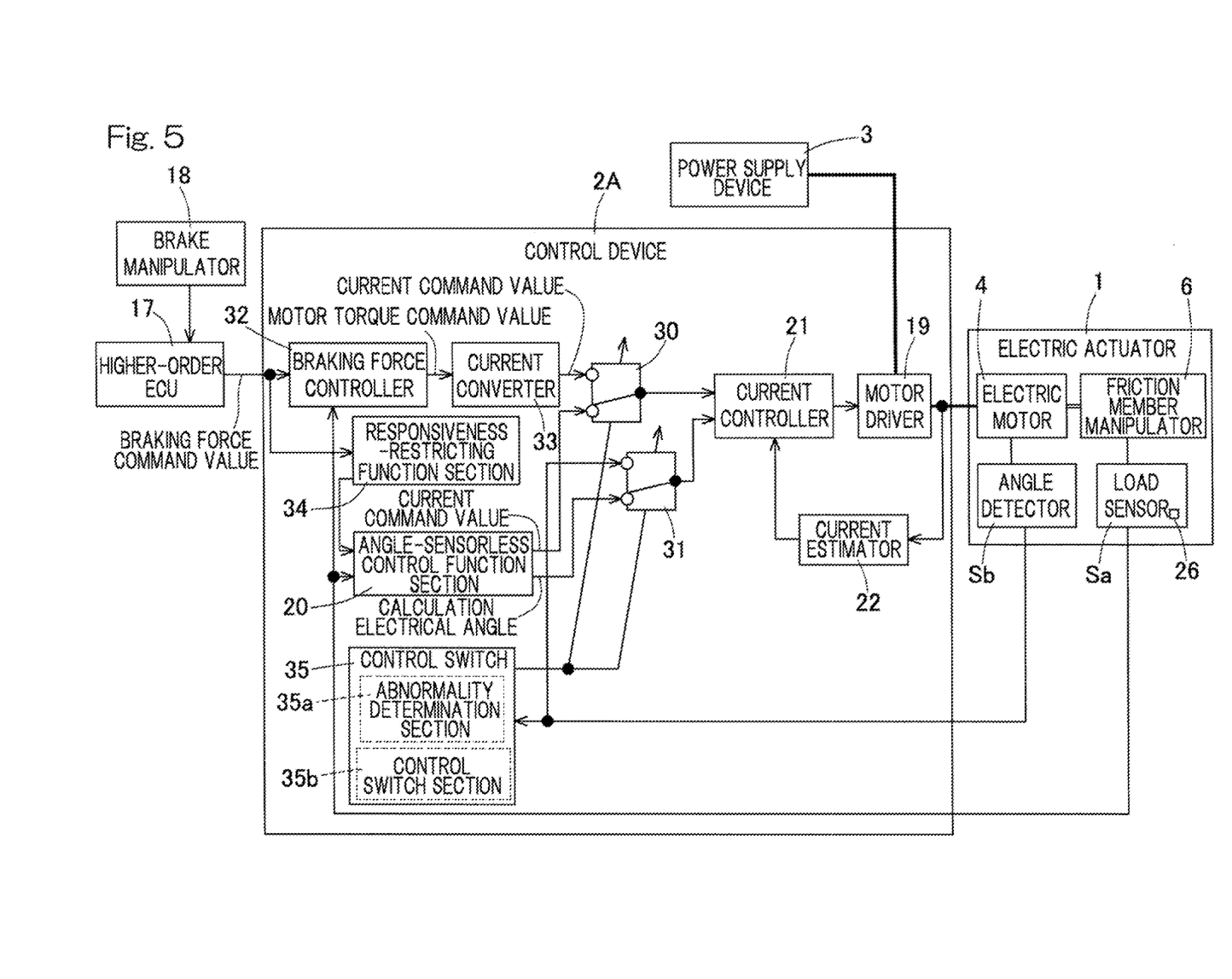
FIG. 5 is a block diagram of the control system, in a case where an abnormality occurs in the angle detector, of the electric brake device.

A control device 2A in FIG. 4 and FIG. 5 indicates an example in which an angle detector Sb and an ordinary control system using the angle detector Sb are provided to the configuration example in FIG. 2 and which the configuration example in FIG. 2 is used as a redundant system, for the ordinary control system, in case of occurrence of an abnormality in the angle detector Sb.

FIG. 4 shows connection patterns of switch sections 30 and 31 in a case where the angle detector Sb is normal. FIG. 5 shows connection patterns of the switch sections 30 and 31 in a case where the angle-sensorless control function section 20 is used when an abnormality occurs in the angle detector Sb.

As shown in FIG. 4 and FIG. 5, the electric actuator 1 includes the angle detector Sb for directly detecting an angle of the electric motor 4 or a physical amount equivalent to the angle. As the angle detector Sb, for example, an angle sensor such as a resolver or a magnetic encoder is preferably used since such an angle sensor is highly accurate and highly reliable. However, any of various types of sensors such as an optical encoder can also be used.

The control device 2A includes, in addition to the constituents in the configuration example (FIG. 2) of the aforementioned embodiment, a braking force controller 32, a current converter 33, a responsiveness-restricting function section 34, a control switch 35, and the switch sections 30 and 31. The braking force controller 32 performs control calculation such that a braking force command value given from the higher-order ECU 17 is exerted. Specifically, as shown in FIG. 4, in a case where the angle detector Sb is normal, the braking force controller 32 performs, for example, load feedback control in which the braking force command value is converted into an actuator load that is a load of the electric actuator 1 and follow-up control is performed such that a sensor output from the load sensor Sa follows the actuator load. Accordingly, highly-accurate braking force control can be easily performed. The braking force controller 32 obtains a motor torque command value required for the braking force control.

The current converter 33 performs, for example, two-phase conversion on the motor torque command value from the braking force controller 32, thereby converting the motor torque command value into a current command value in orthogonal axes (the d axis and the q axis of an orthogonal coordinate system). Alternatively, the current converter 33 may be configured to output the amplitude, the phase, and the like of three-phase alternating current, for example.

The current controller 21 performs follow-up control such that a motor current estimated by the current estimator 22 follows the current command value from the current converter 33. As this follow-up control, for example, feedback control or feedforward control based on motor characteristics and the like may be used, or the feedback control and the feedforward control may be used in combination. The current controller 21 performs, in addition to the follow-up control of the motor current, control such that the motor current comes to have a current phase that is based on a detection result from the angle detector Sb.

As shown in FIG. 5, the control switch 35 includes an abnormality determination section 35a for determining whether or not the angle detector Sb is normal, and a control switch section 35b. The abnormality determination section 35a may perform, for example: determination, as to abnormality, that uses an abnormality self-diagnosis function of the angle detector Sb or the like; determination, as to abnormality, that is based on comparison with a sensor output from another sensor or the like such as the load sensor Sa; or these determinations combined. When the abnormality determination section 35a determines that the angle detector Sb is not normal (i.e., is abnormal), the control switch section 35b switches the switch sections 30 and 31 to the control system using the angle-sensorless control function section 20.

In a case where the angle-sensorless control function section 20 is used, control performance becomes lower than that of the ordinary control system (FIG. 4) using the angle detector Sb. Therefore, as shown in FIG. 5, the control device 2A in this example includes the responsiveness-restricting function section 34 which performs restriction such that the response speed of the electric brake device is reduced in a case where the angle detector Sb is not normal and control is executed by the angle-sensorless control function section 20, as compared to a case where the angle detector Sb is normal. As the responsiveness-restricting function section 34, for example, a low-pass filter is used.

Here, in the case where the control is executed by the angle-sensorless control function section 20, overshoots or vibrations may occur owing to generation of a relatively great deviation between the calculation electrical angle and the actual electrical angle due to a steep change in the braking force command value. Therefore, by the responsiveness-restricting function section 34 restricting the responsiveness of the electric brake device when the angle detector Sb is not normal as mentioned above, overshoots and vibrations can be suppressed, whereby the stability of the control system can be enhanced. Thus, the control system using the angle-sensorless control function section 20 is preferably provided with the responsiveness-restricting function section 34 for the braking force command value so as to restrict the responsiveness.

FIG. 5 shows an example in which the responsiveness-restricting function section 34 is provided only for a braking force command value that is to be inputted to the angle-sensorless control function section 20. However, the responsiveness may be restricted in the following manner: the responsiveness-restricting function section 34 is provided (not shown) also for a braking force command value that is to be inputted to the braking force controller 32 of the ordinary control system, and time constants that are different from each other are set for the responsiveness-restricting function sections 34, 34 corresponding the angle-sensorless control function section 20 and the braking force controller 32, and specifically, the time constant of the responsiveness-restricting function section 34 for the angle-sensorless control function section 20 is set to be larger than the other.

Each of the switch sections 30 and 31 is illustrated for convenience of explaining a flow of a signal, and may be implemented by, for example, divergence command of an IF condition or the like in software, and thus are not necessarily to be an actual switch or a function of performing a switch operation.

The control device may have a function of performing determination as to a brake-released state where no braking force is generated, and may set the motor current to zero when the brake-released state is determined to have been achieved. Whether or not the brake-released state has been achieved, can be determined on the basis of, for example, a sensor output from the load sensor. In this case, the power consumption in the brake-released state can be reduced. As a conversion mechanism portion of the linear motion mechanism, instead of a planetary roller, it is possible to use: various types of screw mechanisms such as a ball screw; a mechanism using the slope of a ball ramp or the like; or the like. The electric actuator may have a configuration in which the speed reduction mechanism is not interposed.

Although the present invention has been fully described in connection with the preferred embodiments thereof with reference to the accompanying drawings, numerous additions, changes, or deletions can be made without departing from the gist of the present invention. Therefore, such additions, changes, and deletions are also construed as included within the scope of the present invention.

REFERENCE NUMERALS 2, 2A . . . control device
4 . . . electric motor
6 . . . friction member manipulator
9 . . . friction member
20 . . . angle-sensorless control function section
23 . . . electrical angular speed calculation section
24 . . . calculation electrical angle determination section
25b . . . current phase determination section
26 . . . braking force estimator
34 . . . responsiveness-restricting function section
35a . . . abnormality determination section
Br . . . brake rotor
Sa . . . load sensor
Sb . . . angle detector

What is claimed is:

1. An electric brake device comprising:
   a brake rotor;
   a friction member configured to be brought into contact with the brake rotor;
   a friction member manipulator configured to bring the friction member into contact with the brake rotor;
   an electric motor configured to drive the friction member manipulator;
   a braking force estimator configured to obtain a braking force estimated value which is an estimated value of braking force generated when the friction member is brought into contact with the brake rotor by the friction member manipulator; and
   a control device configured to perform follow-up control such that the braking force estimated value estimated by the braking force estimator follows a given braking force command value, wherein
   the control device includes an angle-sensorless control function section configured to determine a target phase of a motor current of the electric motor irrespective of an actual angle of the electric motor and control the electric motor to have a current value that is based on the determined target phase of the motor current, and
   the angle-sensorless control function section includes a current phase determination section configured to determine a current phase of the motor current of the electric motor on the basis of a deviation between the braking force command value and the braking force estimated value.

2. The electric brake device as claimed in claim 1, wherein
   the angle-sensorless control function section includes:
   an electrical angular speed calculation section configured to determine an electrical angular speed of the motor current of the electric motor on the basis of the deviation between the braking force command value and the braking force estimated value; and
   a calculation electrical angle determination section configured to determine an electrical angle of the electric motor on the basis of an integral value of the determined electrical angular speed, and
   the current phase determination section controls the motor current of the electric motor to have such a current phase as to satisfy a current condition that, if the actual electrical angle of the electric motor lags behind the determined electrical angle, the motor torque increases relative to a magnitude of a predetermined motor current, and if the actual electrical angle of the electric motor advances from the determined electrical angle, the motor torque decreases relative to a magnitude of a predetermined motor current.

3. The electric brake device as claimed in claim 1, wherein
   the control device
   has a function of determining a magnitude of the motor current of the electric motor on the basis of one or both of the braking force command value and the braking force estimated value, and
   controls the motor current of the electric motor on the basis of the current phase and the magnitude of the motor current.

4. The electric brake device as claimed in claim 3, wherein,
   when a value based on a braking force, which is at least one of the braking force command value and the braking force estimated value, becomes smaller than a predetermined value, the control device sets the magnitude of the motor current to a predetermined lower limit value irrespective of the value based on the braking force.

5. The electric brake device as claimed in claim 3, wherein
   the control device
   has a function of performing determination as to a brake-released state where the braking force is not generated, and
   sets the motor current to zero when the brake-released state is determined to have been achieved.

6. The electric brake device as claimed in claim 1, the electric brake device further comprising an angle detector configured to directly detect an angle of the electric motor or a physical amount equivalent to the angle, wherein
   the control device includes an abnormality determination section configured to determine whether or not the angle detector is normal, and,
   when determination that the angle detector is normal is made by the abnormality determination section, the control device controls the motor current of the electric motor to have a current phase that is based on a detection result from the angle detector, whereas, when determination that the angle detector is not normal is made by the abnormality determination section, the control device controls the electric motor by means of the angle-sensorless control function section.

7. The electric brake device as claimed in claim 6, wherein
   the control device includes a responsiveness-restricting function section configured to perform restriction such that a response speed of the electric brake device is reduced in a case where the determination that the angle detector is not normal is made and control is executed by the angle-sensorless control function section, as compared to a case where the angle detector is normal.

* * * * *